United States Patent
Gottschlag

(10) Patent No.: US 9,008,361 B2
(45) Date of Patent: Apr. 14, 2015

(54) METHOD FOR VISUALIZING ZONES OF HIGHER ACTIVITY IN SURVEILLANCE SCENES

(75) Inventor: Daniel Gottschlag, Nuremberg (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 13/636,820

(22) PCT Filed: Mar. 21, 2011

(86) PCT No.: PCT/EP2011/054191
§ 371 (c)(1),
(2), (4) Date: Nov. 20, 2012

(87) PCT Pub. No.: WO2011/117170
PCT Pub. Date: Sep. 29, 2011

(65) Prior Publication Data
US 2013/0094703 A1 Apr. 18, 2013

(30) Foreign Application Priority Data
Mar. 26, 2010 (DE) .......................... 10 2010 003 336

(51) Int. Cl.
*G06K 9/00* (2006.01)
*G06T 7/20* (2006.01)
*G06T 19/20* (2011.01)
*H04N 7/18* (2006.01)
*H04N 5/225* (2006.01)

(52) U.S. Cl.
CPC .............. *G06K 9/00771* (2013.01); *G06T 7/20* (2013.01); *G06T 19/20* (2013.01); *H04N 7/183* (2013.01); *G06T 2207/10016* (2013.01); *G06T 2207/30232* (2013.01)
USPC ............................ 382/103; 348/143; 348/169

(58) Field of Classification Search
USPC .......... 382/103, 107, 236; 348/143, 169, 170, 348/171, 172, 352; 345/629, 630
See application file for complete search history.

(56) References Cited

U.S. PATENT DOCUMENTS 7,787,011 B2 * 8/2010 Zhou et al. .................... 348/143
(Continued)

FOREIGN PATENT DOCUMENTS

| CN | 101141633 | 3/2008 |
|---|---|---|
| WO | 2009/068336 | 6/2009 |

OTHER PUBLICATIONS

Liu et al., "Schematic Visualization of Object Trajectories across Multiple Cameras for Indoor Surveillances," 2009 Fifth International Conference on Image and Graphics, IEEE, Piscataway, NJ, USA, Sep. 20, 2009, pp. 406-411.
International Search Report for Application No. PCT/EP2011/054191 dated May 27, 2011 (English Translation and Original, 6 pages).

(Continued)

*Primary Examiner* — Abolfazl Tabatabai
(74) *Attorney, Agent, or Firm* — Michael Best & Friedrich LLP

(57) ABSTRACT

The invention relates to a method for visualizing zones of higher activity in a monitoring scene monitored by at least one monitoring device (111, 111', 111"), wherein moving objects (112, 112', 112") are identified and/or tracked (102, 102', 102") by the at least one monitoring device. A spatial localization (113, 113',113") of the moving objects (112, 112', 112") is determined (103, 103', 103"), the zones of higher activity are detected and a visualization of zones of higher activity of the moving objects (112, 112', 112") is performed.

11 Claims, 2 Drawing Sheets

(56) References Cited

U.S. PATENT DOCUMENTS

| | | |
|---|---|---|
| 2003/0085992 A1* | 5/2003 | Arpa et al. ............ 348/47 |
| 2006/0279630 A1 | 12/2006 | Aggarwal et al. |
| 2008/0170120 A1* | 7/2008 | Senior ............ 348/143 |
| 2010/0013931 A1 | 1/2010 | Golan et al. |
| 2010/0239122 A1* | 9/2010 | Busch et al. ............ 382/103 |

OTHER PUBLICATIONS

Wang et al., "Correspondence-Free Multi-Camera Activity Analysis and Scene Modeling," Computer Vision and Pattern Recognition, Jun. 23, 2008, pp. 1-8.

Braumann, "Glyphenbasierte Techniken zur Informationsvisualisierung," Dec. 2, 2006, pp. 1-10.

* cited by examiner

METHOD FOR VISUALIZING ZONES OF HIGHER ACTIVITY IN SURVEILLANCE SCENES

BACKGROUND OF THE INVENTION

The present invention relates to a method for visualizing zones of higher activity in a surveillance scene monitored by at least one surveillance apparatus, and also to a corresponding surveillance system.

Surveillance systems serve to monitor relevant regions and usually comprise a multiplicity of surveillance apparatuses, for example surveillance cameras which are provided at the relevant regions for recording surveillance scenes. Alternatively, or in addition thereto, use can for example also be made of laser-supported or infrared-supported motion sensors, such as e.g. motion detectors or photoelectric sensors. Stepping plates which trigger a signal when stepped on should be mentioned as a further example. By way of example, the surveillance scenes can comprise parking lots, crossroads, roads, squares, and also regions in buildings, factories, hospitals or the like. The data, for example image data feeds, recorded by the surveillance apparatuses are collected in a surveillance center, where these are evaluated either in an automatic fashion or by surveillance staff.

The manual evaluation of image data feeds in particular can, under certain circumstances, be very difficult because surveillance scenes with a multiplicity of moving objects in particular, e.g. street scenes, require a corresponding large number of moving objects to be monitored and this may also be due to the fact that the image quality of the displayed surveillance scenes is often unsatisfactory, for example as a result of changes in illumination, environmental influences or dirtying of the surveillance cameras. Surveillance scenes usually monitored contain three-dimensional objects, with movement processes often being covered by the objects and hence not being accessible to direct surveillance. It is therefore expedient for there to be electronic support for the surveillance staff.

It is common practice to display surveillance scenes captured by multi-camera networks as three-dimensional models (referred to as 3D scene models below). Such 3D scene models can have an arbitrary degree of abstraction; for example, it is possible to display surfaces of monitored houses, signals, streets and the like as abstracted 2D structures. A 3D scene model can also have an abstracted, grid-shaped reproduction of three-dimensional objects, and so it becomes possible to identify the objects which were captured by the surveillance apparatuses but are covered in the current view of the 3D scene model. Such 3D scene models offer the option of interactive navigation, for example by means of appropriate computer systems.

In this context, DE 10 2007 048 857 A1 has disclosed a method which allows a three-dimensional scene model to be equipped with realistic textures, with it being possible for the textures to be updated at regular or irregular intervals.

WO 2009/068336 A2 has disclosed model-based 3D position determination of an object. To this end, the object is recorded by a calibrated camera, with the 3D position of the object being determined as intersection of the line of sight with the scene model.

The article "Modeling and Visualization of Human Activities for Multi-Camera Networks" by Sankaranarayanan et al., filed in July 2009 (EURASIP Journal on Image and Video Processing), discloses a system by means of which it is possible to project person movements, indentified in images, into 3D scene models. By using a priori knowledge of the 3D structure of the scene and the camera calibration, the system is able to localize persons who are moving through the scene. Activities of interest are determined by virtue of the fact that models of these activities are compared to observations within the scope of a self-learning method.

In "Correspondence-Free Multi-Camera Activity Analysis and Scene Modeling" (Proceedings of IEEE Computer Society Conference on Computer Vision and Pattern Recognition 2008), Wang et al. describe the combination of aligned movements, as a result of which zones of higher activity are even to be displayed in overcrowded scenes. However, this does not comprise the use of a 3D scene model.

In the methods known from the prior art, the display of individual trajectories in the case of a multiplicity of moving objects often leads to great complexity and, ultimately, to less information content. Movements covered by objects or merely captured by individual cameras are often impossible to capture. Moreover, if erroneous object correspondences are present, i.e. if there is not absolutely exact camera matching, this often leads to a strong deterioration in the quality of the trajectories.

There therefore still is the need for methods for visualizing zones of higher activity, particularly in multi-camera networks, which overcome the aforementioned disadvantages of the prior art.

SUMMARY OF THE INVENTION

The present invention can be used, in particular, as a system for real-time visualization of zones of higher activity in multi-camera networks in the field of video surveillance technology.

It should be understood that the utilized terms "movement occurrence" and "zones of higher activity" can comprise both movement density and movement intensity. Movement density can relate to a number of moving objects. If there is a movement of a large number of moving objects there is a high movement density. Movement intensity can for example also relate to the speed of one of the moving objects. Depending on the requirements, emphasis on movement density or movement intensity can be of interest in a surveillance scene. Thus, for example, an individual object moving quickly but separately from other objects may require a closer look or, alternatively, there may be a need for targeted surveillance of regions with a high density of moving objects.

The method according to the invention renders it possible to identify objects and follow objects by means of surveillance apparatuses, in particular by means of image analysis of the video material from a plurality of calibrated cameras (individual cameras without overlapping fields of view and cameras with overlapping fields of view). Additionally, it is however likewise possible to use other surveillance apparatuses, e.g. motion sensors.

There may be imaging (projection) of zones of higher activity, determined on the basis of identified person and object movements, into a virtual 3D model of the monitored scene. As a result of this, regions with high movement occurrence or with zones of higher activity can be directly highlighted visually in the 3D model. As a result of the preferred option of interactive navigation in the 3D scene model it is possible to navigate directly to such regions with high movement occurrence or to such zones of higher activity in order to observe these regions more closely.

By way of example, identified person and object movements are displayed in a virtual 3D model of the monitored scene as described in WO 2009/068336 A2, filed by the applicant; reference here is made thereto in respect of details of the implementation. For the purposes of 3D position determination based on a model disclosed there, an object is recorded by a calibrated camera, with the 3D position of the object being determined as the intersection of the line of sight with the scene model. The 2D/3D imaging can also be brought about by simple base models, in which the objects identified in the image are directly projected on the base plane with the aid of the camera calibration information. In the case of different types of sensors (e.g. motion detectors), imaging may not be required because the sensor data can be directly included in the model provided that the position of the sensor in the scene model is known.

In principle, 3D models can be created from the respectively generated image material, but these can for example also be provided in advance, for example by measurement data and/or CAD software.

In a corresponding system, the proposed method advantageously displays an activity (such as movement occurrence or a zone of higher activity) in an abstract fashion. Movements of a plurality of spatially proximal objects can be combined in order to identify zones of higher activity. The quantity of the activity can be encoded by the size of a highlighted region and the color thereof. In particular, the number, speed, acceleration and/or the jerkiness of the moving objects can serve as a measure for the quantity. Such a visual display of the zones of higher activity can be superposed on the image of the virtual 3D model such that the movement occurrence remains identifiable even in cases of covering objects. The visualization can in particular be actioned as a false-color display (color coding of the amount of activity).

The proposed measures therefore permit a clear display of movement intensities, even in overcrowded scenes. Since movements can preferably be captured by individual cameras within the scope of the method according to the invention, a possible erroneous object correspondence between cameras now only plays a minor role.

The display within the scope of the method according to the invention can have any degree of abstraction, and so there can no longer be a distraction from relevant movements as a result of an over-realistic display. In contrast to the aforementioned methods in the prior art, a current number of active objects can be utilized and evaluated in real-time.

By way of example, in the method disclosed by Sankaranarayanan et al. it is not possible to identify activities in covered scene regions (e.g. behind walls). The photorealistic display provided therein distracts from the actual movement as a result of a multiplicity of texture details and complex person models. As a result, the movement is less apparent and so, particularly within the scope of manual evaluation of surveillance scenes or corresponding image data feeds, a movement may not be identified or this identification may be too late. These disadvantages are overcome by the abstracting method for real-time visualization of zones of higher activity, proposed according to the invention.

In contrast to the aforementioned article by Wang et al., the observer is now able to include moving objects (movement occurrence), which are recorded by individual cameras (i.e. by cameras that do not have overlapping fields of view with other cameras), visually into the overall context. Likewise, in contrast thereto, it is no longer necessary to accumulate movements over a relatively long period of time.

Hence the measures according to the invention create a direct visual feedback for movements, even in covered regions of the 3D model, by means of an activity indicator superposed onto the 3D image. By encoding the quantity of the movement occurrence by visual means, such as e.g. color, it is possible to obtain a very fast and clear display of possibly critical movement processes.

Further advantages and developments of the invention emerge from the description and the attached drawing.

It is understood that the features mentioned above and yet to be explained below can be used not only in the respectively specified combination but also in other combinations or on their own, without departing from the scope of the present invention.

The invention is illustrated schematically in the drawing on the basis of exemplary embodiments and will be described in great detail below with reference to the drawing.

DETAILED DESCRIPTION

Figure 1:
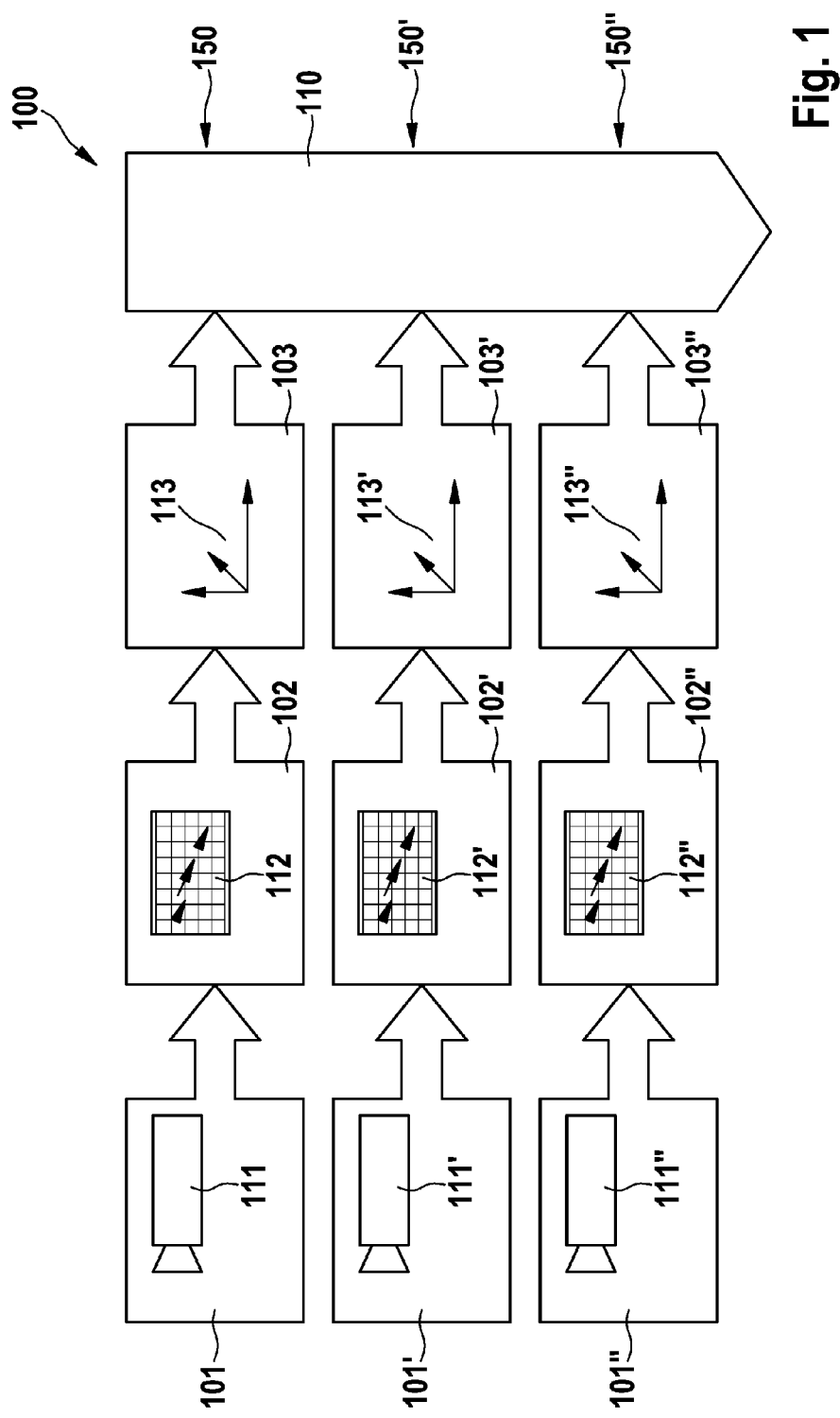
FIG. 1 shows a schematic illustration of a method as per a particularly preferred embodiment of the invention.

A method as per a particularly preferred embodiment of the invention is illustrated schematically in FIG. 1 and denoted by 100 in its entirety. Three partial methods 150, 150', 150", which are executed in parallel and are respectively assigned to individual surveillance apparatuses, are illustrated in FIG. 100. It should be understood that within the scope of the present invention it is also possible for a different number of parallel surveillance partial methods to be executed, each of which then being assigned to its own surveillance apparatus. It is likewise possible to combine partial methods. In the following text, only partial method 150 will be exemplified for reasons of clarity.

An image is recorded, i.e. image material is generated, in an optional step 101 by means of a surveillance apparatus 111 embodied here as a surveillance camera. In particular, the surveillance apparatus 111 is calibrated such that the position, alignment, focal distance, etc. thereof are known.

In step 102, a moving object is identified and/or a trajectory 112 of the moving object is created in the image material, for example by an evaluation apparatus associated with the monitoring apparatus 111. In step 103, the object or objects 112 identified in the previous step 102 are spatially localized 113 in a 3D scene model. By way of example, an object is recorded by the calibrated camera 111 for the purpose of 3D object positioning, with the 3D position of the object being determined as intersection of the line of sight with the scene model. In respect of further details in respect of the embodiment, reference is made here to WO 2009/068336 A2, filed by the applicant. The scene model is preferably obtained from CAD data.

Figure 2:
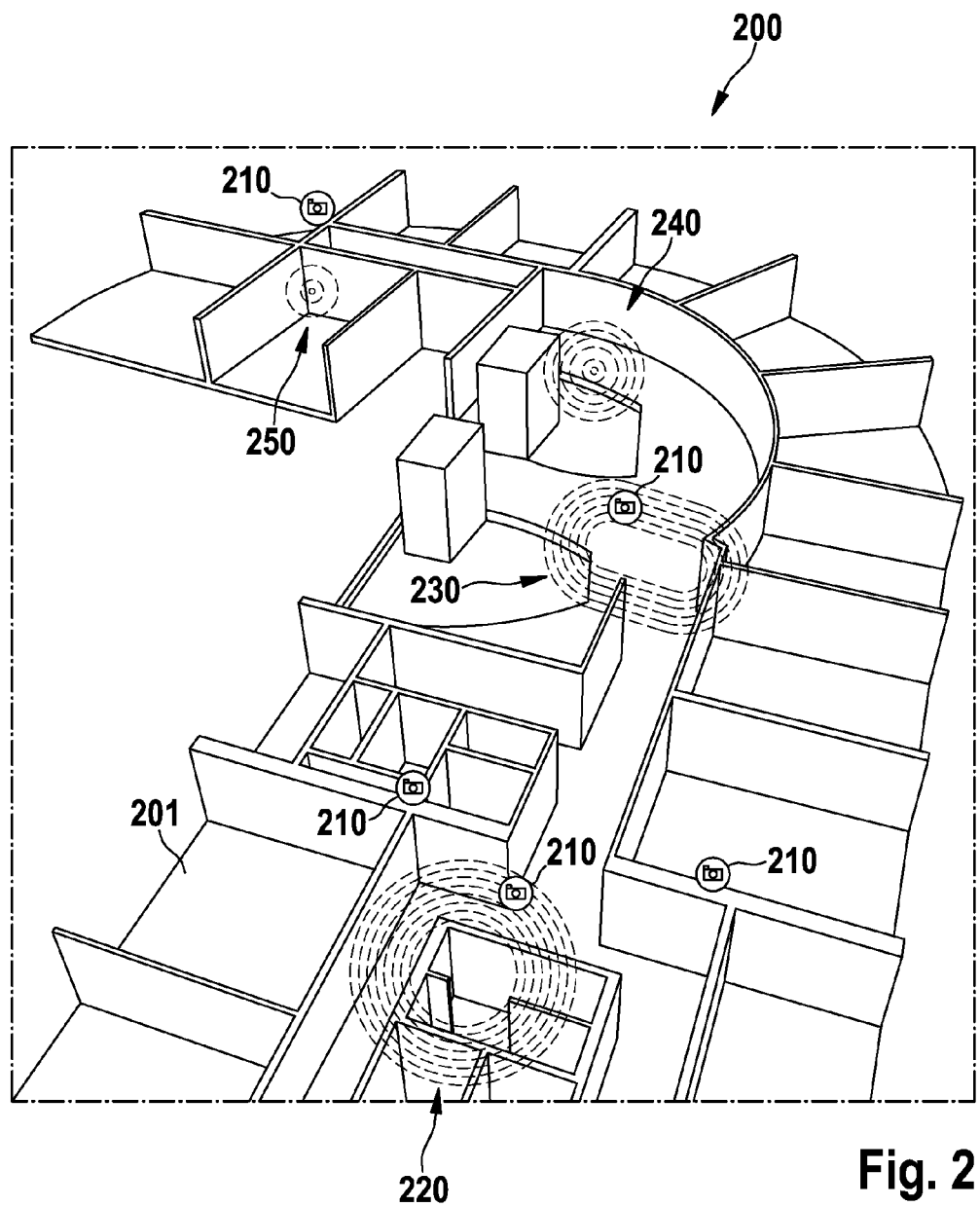
FIG. 2 shows a visualization of zones of higher activity as per a particularly preferred embodiment of the invention.

In step 110, the respective partial methods 150, 150', 150" are combined and used for visualizing the zones of higher movement of the moving objects, as explained in the following FIG. 2. FIG. 2 exemplifies the visualization of the zones of higher activity, as actioned within the scope of a particularly preferred embodiment, and denotes this by 200 overall.

FIG. 2 illustrates an illustration of identified or determined zones of higher activity in a three-dimensional scene model, as can be obtained on e.g. a computer screen on the basis of the invention. The computer screen initially displays the 3D scene model 201, which, in the present example, shows a number of rooms from a perspective view. By way of example, the 3D scene model can be obtained from CAD data. An observer or user of a corresponding evaluation system looks at the computer screen on which a virtual 3D scene is displayed, in this case exemplified as a building. The rooms are equipped with calibrated and adjusted cameras as image recording device at specific points, the positions of which are indicated here (optional) and are respectively denoted by 210 within the 3D scene model.

If the cameras 210 identify objects—for example on the basis of a preferred embodiment as per FIG. 1—then the display is, as per a preferred embodiment of the invention, actioned by indicating zones of higher activity.

According to FIG. 2, four zones of higher activity 220, 230, 240 and 250 are illustrated, which—like a thermal image or contours—represent the identified activity. In the present example, the number of moving objects is used as a measure for the activity. It is possible to identify that there is only little activity present at 250, which can correspond to one moving object. There is more activity at 240, which can for example correspond to two moving objects. At 230 there is an even higher activity which is also more distributed in space, from which it is possible to deduce that a number of objects are moving in a relatively large region at point 230. Finally, at the point 220 there is a very high but concentrated activity, from which it is possible to deduce that very many moving objects are situated at this point.

The movement speed can serve as an alternative measure for a zone of higher activity. In this case, faster moving objects are displayed with a higher intensity and slower moving objects are displayed with a lower intensity.

By way of example, the intensity distribution can be provided as a bell-shaped curve about the moving object, normalized to the respective measure, with it then being possible to add the intensities of adjacent objects correspondingly. The number of moving objects serves as measure for the activity in a preferred embodiment. However, it should also be understood that the speed, acceleration and/or jerkiness can serve as measure, with it being possible to process these mathematically, in particular it being possible for these to be added and also averaged, or the like. According to a preferred embodiment, the activity level is displayed in color like in a thermal image, wherein a high activity can for example be denoted by red to yellow and a low activity can be denoted by green to blue.

The invention claimed is:

1. A method for visualizing (200) zones of higher activity (220, 230, 240, 250) in a surveillance scene monitored by at least one surveillance apparatus (111, 111', 111"; 210), the method comprising:
   a) at least one of identifying and tracing (102, 102', 102") moving objects (112, 112', 112") by the at least one surveillance apparatus (111, 111', 111"; 210),
   b) establishing (103, 103', 103") a spatial localization (113, 113', 113") of the moving objects (112, 112', 112") in the surveillance scene, and
   c) determining and visualizing (200) zones of higher activity (220, 230, 240, 250) of the moving objects (112, 112', 112") in the surveillance scene;
   wherein the zones of higher activity (220, 230, 240, 250) are determined on the basis of a quantity and a movement of identified moving objects (112, 112', 112").

2. The method as claimed in claim 1, wherein the the movement is at least one of speed, acceleration and and/or the jerkiness of identified moving objects (112, 112', 112").

3. The method as claimed in claim 2 wherein the zones of higher activity (220, 230, 240, 250) are visualized by at least one of color-coding and size-coding, with a measure of activity being assigned a color or a size.

4. The method as claimed in claim 1 wherein the zones of higher activity (220, 230, 240, 250) are visualized by at least one of color-coding and size-coding, with a measure of activity being assigned a color or a size.

5. The method as claimed in claim 1 wherein the zones of higher activity (220, 230, 240, 250) are determined on the basis of at least one of bundling movements and bundling movement trajectories.

6. The method as claimed in claim 1, wherein use is made of surveillance apparatuses (111, 111', 111"; 210) with at least one of at least partly overlapping surveillance regions and surveillance apparatuses (111, 111', 111"; 210) with surveillance regions that do not overlap.

7. The method as claimed in claim 1, which is executed in real-time.

8. The method as claimed in claim 1, wherein at least one of at least one surveillance camera (111, 111', 111"; 210) and at least one motion sensor is used as the surveillance apparatus.

9. The method as claimed in claim 1, wherein a 3D scene model (201) is used for visualization purposes.

10. The method as claimed in claim 9, wherein the 3D scene model (201) is a navigable 3D scene model.

11. A surveillance system which is configured to carry out a method as claimed in claim 1, the surveillance system comprising at least one surveillance apparatus (111, 111', 111"; 210) for monitoring a surveillance scene, means for at least one of identifying and tracing (102, 102', 102") moving objects (112, 112', 112"), means for establishing (103, 103', 103") a spatial localization (113, 113', 113") of the moving objects (112, 112', 112") and means for determining and visualizing (200) zones of higher activity (220, 230, 240, 250) of the moving objects (112, 112', 112").

* * * * *